United States Patent [19]

Propst et al.

[11] 4,196,493
[45] Apr. 8, 1980

[54] CASTER HAVING ROLLER BELTS

[76] Inventors: Robert L. Propst, 2347 Londonderry; Paul L. Propst, 2490 Laurelwood, both of Ann Arbor, Mich. 48104

[21] Appl. No.: 943,202

[22] Filed: Sep. 18, 1978

[51] Int. Cl.² .............................................. B60B 33/00
[52] U.S. Cl. ...................................... 16/18 A; 16/47; 305/35 EB
[58] Field of Search ............... 16/18 R, 18 CG, 18 A, 16/42 R; 305/35 EB, 16, 14

[56] References Cited

U.S. PATENT DOCUMENTS

| | | | |
|---|---|---|---|
| 1,345,622 | 7/1920 | Nack | 16/18 R |
| 2,136,778 | 11/1938 | Anttila | 305/35 EB |
| 2,437,312 | 3/1948 | Bailey | 16/18 R |
| 2,472,513 | 6/1949 | Bergquist | 305/35 EB |
| 3,671,051 | 6/1972 | Werft | 305/14 |
| 3,922,754 | 12/1975 | Andersen | 16/18 A |

*Primary Examiner*—George H. Krizmanich
*Attorney, Agent, or Firm*—Olsen and Stephenson

[57] ABSTRACT

A caster consisting of a caster body having lateral body portions on which flexible roller belts of closed loop shape are slidably supported. The lateral body portions are configured so that the portions of the belts in engagement with the under sides of the lateral body portions are in close proximity to each other while the portions of the tracks in engagement with the upper sides of the lateral body portions are spaced apart to accommodate an upright pintle for attaching the caster to an article.

10 Claims, 6 Drawing Figures

CASTER HAVING ROLLER BELTS

BACKGROUND OF THE INVENTION

The present invention relates generally to a caster, and more particularly, to a caster of the type disclosed in applicant's pending application Ser. No. 859,319, filed Dec. 12, 1977. In that application, a caster is disclosed having a pair of roller members of either conical or elliptical shape mounted on opposite sides of a caster body with axes of rotation that converge in an upwardly direction so that balanced forces are applied to the caster as it travels over a supporting surface.

It is, nevertheless, desirable to provide a caster which has a low profile, which utilizes relatively simple and inexpensive components, and which provides a large supporting area for engaging a supporting surface.

It is an object of the present invention,, therefore, to provide a caster having endless tracks on which the caster rides as it is moved over a supporting surface.

It is a further object of the present invention to provide a caster having endless tracks movably mounted on opposite sides of a caster body with inclined axes of rotation that converge in a upwardly direction from the supporting surface upon which the caster travels so as to impart balanced forces on the caster.

SUMMARY OF THE INVENTION

In accordance with the present invention, a caster is provided consisting of a caster body having an upright pintle member located at its rear portion for swivably attaching the caster to an article. The caster body has lateral body portions on opposite sides of pintle member which support a pair of generally flat and flexible tracks or roller belts of endless closed loop shape in a side-by-side relationship.

The lateral body portions each include a generally elliptically-shaped, continuous outer surface of which the upper surface area is inclined downwardly in directions extending transversely of the caster body. This upper surface area also is displaced transversely outwardly of the caster body with respect to the lower or under side surface area of the outer surface. The track is slidably mounted on the continuous surface of the body portion so that the portion of the track in engagement with the upper surface area of the body portion is inclined downwardly in the transverse direction away from the caster body. The upper portion of the track is therefore displaced transversely with respect to the portion of the track in engagement with the under side or lower surface area of the body portion. Accordingly, the portions of the tracks in engagement with the under side surface areas of the lateral body portions are positioned in close proximity to each other and the portions of the tracks that are in engagement with the upper surface areas of the later body portions are spaced apart from each other on opposite sides of the pintle member. The side-by-side positioning of the track members enables the caster to be rotated easily about its pintle member. The spaced-apart positioning of the portions of the track in engagement with the upper surface areas of the lateral body portions enables a caster of compact size having a relatively large surface area that engages the floor to be fabricated to thus reduce material costs and enhance the esthetic appearance of the caster body.

Each track or roller belt has an inwardly extending projection or ridge formed on its inner surface. This ridge is of a continuous closed-loop shape that conforms to the closed-loop shape of the track itself. A longitudinally extending groove is formed in the continuous outer surface of each lateral body portion to receive this projection. Consequently, the track is restrained from transverse displacement during movement of the caster over its supporting surface. The groove in the continuous surface of each body portion thus aids in defining the path of the sliding movement of the track over the body portion.

The caster of the present invention utilizes low-friction materials which are easily molded to enable the inexpensive manufacture of a caster. The low-friction materials used enable the tracks to slide easily over the outer surface of the lateral body portions to efficiently move the caster over the floor.

Further objects, features, and advantages of the present invention will become apparent from consideration of the following description when taken in connection with the appended claims and the accompanying drawing in which:

Figure 1:
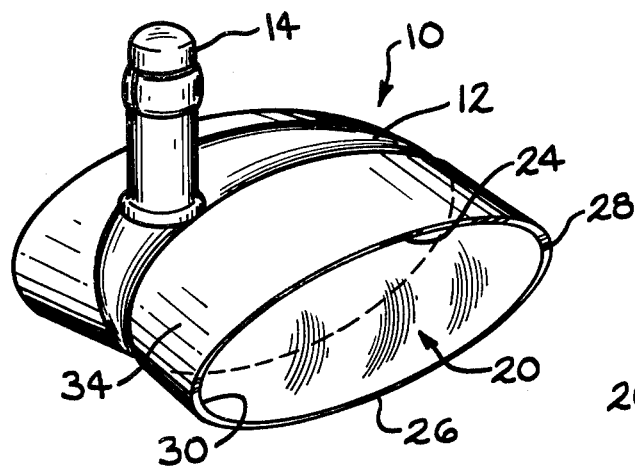
FIG. 1 is a perspective view of the caster of the present invention.

With reference to the drawing, the caster of the present invention, indicated generally at 10 in FIG. 1, includes a caster body 12 and a pintle member 14 mounted on the caster body 12 at its rear portion. This pintle 14 defines a vertical axis about which the caster body 12 is rotatable when it is mounted on an article such as a piece of furniture.

The caster body 12 is formed having a pair of lateral body portions 18 and 20 on opposite sides of the pintle member 14. Each body portion 18 and 20 which together form mounting means for tracks or roller belts has a continuous outer surface 22 that is formed to a generally elliptical shape. The continuous surface 22 has an upper portion 24, a lower portion 26, a fore portion 28, and an aft portion 30. The upper protion 24 of the continuous surface 22 is inclined downwardly in directions extending transversely outwardly from the pintle member 14. The upper portion 24 is also displaced transversely with respect to the lower portion 26. The portions 24, 26, 28, and 30 define track-supporting means for supporting a track on the caster 10.

Figure 3:
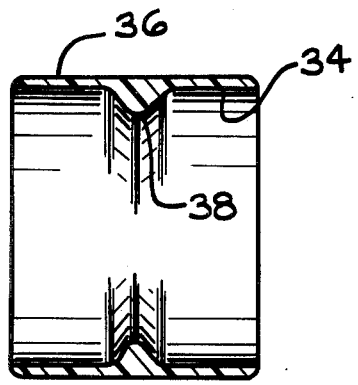
FIG. 3 is an elevational sectional view of a track used on the caster in FIG. 1.
Figure 4:
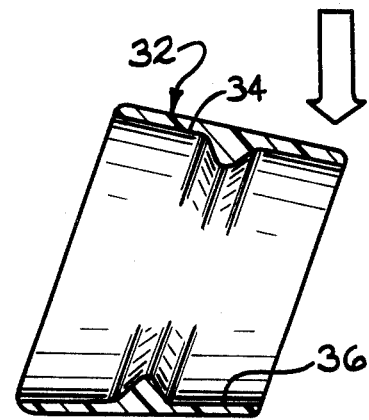
FIG. 4 is an elevational sectional view of the track of FIG. 3, but shown in a flexed condition.
Figure 5:
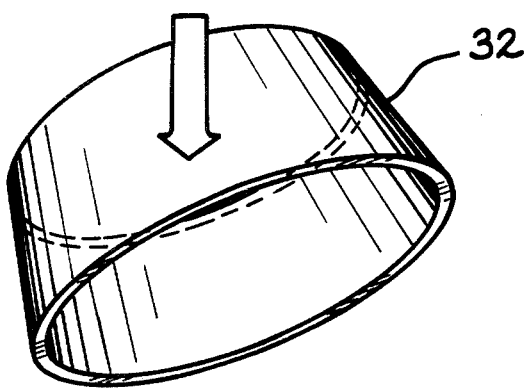
FIG. 5 is a perspective view of the flexed track shown as if it were mounted on the caster in FIG. 1.

Tracks or roller belt members 32 are provided to enable the translatory movement of the caster 10 over a supporting surface. One track 32 is slidably mounted on the body portion 18 while the other track 32 is slidably mounted on the body portion 20. Each track is generally flat and flexible and is of an endless closed-loop shape. The track 32 has an inner surface 34 which rides on the continuous surface 22 and an outer surface 36 which engages a floor or similar supporting surface. As seen in FIG. 3, the upper and lower portions of the track 32 are in general alignment when the track 32 is not flexed. When mounted on one of the body portions 18 or 20, the track is flexed or twisted as is best seen in FIGS. 4 and 5; that is, the portion of the track 32 that is in engagement with the upper portion 24 of the continuous surface 22 is inclined downwardly and outwardly of the caster body 12. The portion of the track 32 in contact with the upper portion 24 also is displaced transversely with respect to the lower portion 26 and the portion of the track 32 that is in engagement with the lower portion 26. The fore and aft portions 28 and 30 of the continuous surface 22 diverge away from each other as does the portions of the track 32 that are in engagement with the portions 28 and 30.

An inwardly-extending projection or ridge 38 is integrally formed with the track 32 on its inner surface 34 and is of an endless closed-loop shape that is similar to the closed-loop shape of the track 32. A continuous groove 40 is formed in the outer surface 22 and extends longitudinally of the caster body 12. The groove 40 is formed in each body portion 18 and 20 so that a portion of the groove 40 on the upper portion 24 is displaced transversely outwardly of the caster body 12 with respect to the portion of the groove 40 on the lower portion 26. Thus, the groove 40 follows the path of movement of the track 32 on the surface 22. The groove 40 receives the projection 38 on the track 32 and cooperates therewith to restrain the transverse displacement of the track 32 from the body portion on which it is mounted during translatory movement of the caster 10 over a supporting surface. Each track 32 therefore slides over the body portion in the longitudinal direction of the outer surface 22 and the groove 40.

Figure 2:
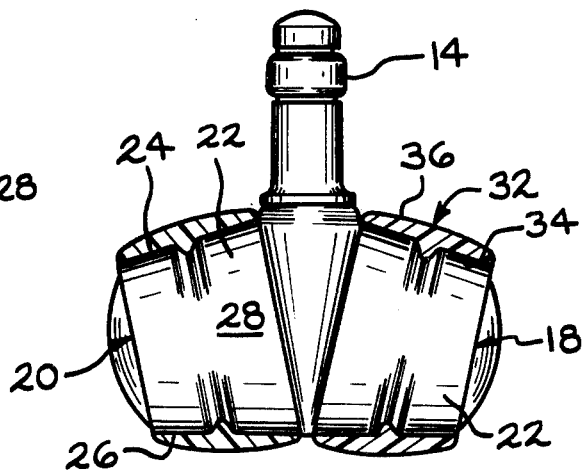
FIG. 2 is a front elevational view of the caster shown in FIG. 1.

As can be seen in FIG. 2, the tracks 32 are mounted on the caster body 12 in a side-by-side relation on opposite sides of the pintle 14. The portions of the tracks 32 in engagement with the under sides or lower portions 26 of the continuous surfaces 22 are in close proximity with each other while the portions of the tracks 32 in engagement with the upper portions 24 of the continuous surfaces 22 are spaced apart from each other so as to accommodate the pintle 14. By this construction, a compact caster 12 is provided.

Figure 6:
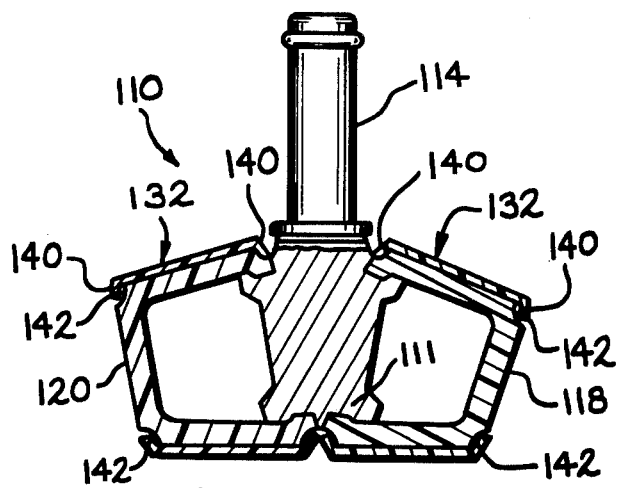
FIG. 6 is a sectional view of a modified form of the caster of the present invention.

In a modified form of the present invention as shown in FIG. 6, a caster 110 having a caster body assembly 112 is provided. Lateral body portions 118 and 120 each having a hollow cavity, are suitably mounted on a base 111. A pintle 114 is mounted on the caster 110 at its rear portion. The lateral body portions 118 and 120 are configured in a manner that is similar to the shape of the body portions 18 and 20 of the caster 10. Flexible and generally flat tracks or roller belts 132 are slidably mounted on the body portions 118 and 120. Each track 132 has a pair of spaced-apart, inwardly-projecting flanges 140 located along its opposite edges.

The body portions 118 and 120 have spaced-apart side surfaces 142 extending in directions that are generally perpendicular to the outer continuous surface 122 on the body portions 118. The side surfaces 142 cooperate with the flanges 140 to restrain the transverse displacement of the track 132 from body portions 118 or 120 on which it is mounted.

From the above description, it can be seen that an improved caster 10 is provided having tracks 32 slidably mounted on a caster body 12. The transverse displacement of the upper portions of the tracks 32 enables the compact construction of the caster 10. The caster 12 is easily rotatable about the pintle 14 and the low-friction materials utilized facilitates the sliding of the tracks 32 over the body portions 18 and 20. The caster body 10 is comprised of only a few components, it can be easily fabricated, and is inexpensive to manufacture.

What is claimed:

1. A caster comprising a body rotatable about a vertical axis, a generally flat and flexible track of endless closed-loop shape, means movably mounting said track on said body to enable translatory movement of said caster over a supporting surface engaged by said track, said mounting means including oppositely facing and relatively fixed upper and lower track-supporting means over which said track traverses, said upper track-supporting means being displaced transversely of said lower track-supporting means and being inclined downwardly in directions extending transversely outwardly from said body axis, said upper and lower track-supporting means being relatively disposed so that the portion of said track in engagement with said upper track-supporting means is inclined downwardly in said transverse direction and is displaced transversely with respect to the portion of said track in engagement with said lower track-supporting means.

2. A caster according to claim 1 wherein said mounting means further includes fore and aft track supporting means diverging away from each other in directions extending transversely of said body axis, the portion of said track in engagement with said fore track-supporting means diverging in said transverse directions with the portion of said track in engagement with said aft track-supporting means.

3. A caster according to claim 2 wherein said upper, lower, fore, and aft track-supporting means form a generally continuous surface over which said track is slidably movable, the upper portion of said continuous surface being inclined downwardly in directions extending transversely of said body axis and being displaced transversely with respect to the lower portion of said continuous surface.

4. A caster according to claim 3 further including coacting means on said track and said body for maintaining said track in slidable engagement with said continuous surface.

5. A caster according to claim 4 wherein said coacting means comprises an elevated ridge integrally formed with said track and having an endless closed-loop shape, said ridge projecting inwardly away from said track, and means forming a groove in said continuous surface adapted to receive said ridge to restrain said track from being transversely displaced from said continuous surface.

6. A caster according to claim 4 wherein said track includes a pair of spaced-apart extensions, each of said extensions having an endless closed-loop shape similar to the closed-loop shape of said track, said extensions projecting inwardly away from said track, and a pair of spaced-apart surfaces on said body substantially perpendicular to said continuous surface, said extensions on said track being positioned in a side-by-side relation with said retaining surfaces so that transverse movement of said track from said continuous surface is restrained.

7. A caster according to claim 5 further including a second track similar in construction to said first track, said second track being slidably mounted on said body in a side-by-side relation with said first track and in a manner similar to the mounting of said first track on said body, said vertical axis being located between said tracks.

8. A caster comprising a body, an upright pintle member on said body defining a vertical axis about which said body is rotatable, a pair of generally flat and flexible tracks, each of said tracks having an endless closed-loop shape, said tracks being movably mounted on said body on opposite sides of said pintle member in side-by-side relation with each other to enable the translatory movement of said caster over a supporting surface engaged by said tracks, said mounting means including a pair of lateral body portions, one of said tracks being slidably mounted on one body portion and the other of said tracks being slidably mounted on the other body portion, each of said laterally extending body portions comprising upper and lower track-supporting means, said upper track-supporting means being displaced transversely of said lower track-supporting means and being inclined downwardly in a direction extending transversely outwardly from said pintle member, said upper and lower track-supporting means defining upper and lower surfaces which are relatively fixed and over which said track slides, the portion of said track in engagement with said upper surfaces being inclined downwardly in said transverse direction and being displaced transversely with respect to the portion of said track in engagement with said lower surface, said lateral body portions being arranged so that the portions of said tracks in engagement with said lower surfaces are in close proximity with each other while the portions of said tracks in engagement with said upper surfaces are spaced apart on opposite sides of said pintle member.

9. A caster according to claim 1, wherein said lower supporting means is generally flat over a longitudinal portion thereof so that the portion of said track in engagement therewith defines an elongated supporting surface for distribution of a downward load applied to said caster.

10. A caster according to claim 9, wherein said track-supporting means defines an outer surface having a generally elliptical shape.

* * * * *